(12) United States Patent
Ghani (10) Patent No.: US 6,728,484 B1
(45) Date of Patent: Apr. 27, 2004

(54) METHOD AND APPARATUS FOR PROVIDING CHANNEL PROVISIONING IN OPTICAL WDM NETWORKS

(75) Inventor: Nasir Ghani, Woburn, MA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/391,119

(22) Filed: Sep. 7, 1999

(51) Int. Cl.[7] .............................................. H04B 10/24
(52) U.S. Cl. ............................ 398/42; 398/74; 385/50
(58) Field of Search ............................... 398/1, 74, 42, 398/79, 82, 86, 87, 88, 90; 385/50

(56) References Cited

U.S. PATENT DOCUMENTS

| | | | | |
|---|---|---|---|---|
| 5,278,687 A | * | 1/1994 | Jannson et al. | 359/125 |
| 6,160,651 A | * | 12/2000 | Chang et al. | 359/124 |
| 6,219,161 B1 | * | 4/2001 | Chang et al. | 359/124 |
| 6,321,011 B2 | * | 11/2001 | Deacon | 385/50 |

* cited by examiner

Primary Examiner—John A. Tweel, Jr.
(74) Attorney, Agent, or Firm—Squire, Sanders & Dempsey L.L.P.

(57) ABSTRACT

A method and apparatus for providing channel provisioning in optical wavelength division multiplexing (WDM) networks. The method and apparatus provide a distributed framework to provision channels (i.e., wavelengths) in WDM networks. The method includes managing configuration of underlying lower layer optical devices and processing inter-node and client messages and alarm events. The processing of inter-node messages further includes setting-up bandwidth channels between peer nodes in wavelength division multiplexing networks using a channel request message, the channel request message specifying an associated channel feature set for a requested channel, releasing a preexisting channel using a channel release message and managing a resource update message for distributing network information used for route resolution.

52 Claims, 7 Drawing Sheets

METHOD AND APPARATUS FOR PROVIDING CHANNEL PROVISIONING IN OPTICAL WDM NETWORKS

BACKGROUND OF THE INVENTION

1. Field of the Invention

This invention relates in general to fiber optic communication systems, and more particularly to a method and apparatus for providing channel provisioning and optical wavelength division multiplexing (WDM) networks.

2. Description of Related Art

In broadband communication networks, data are increasingly transmitted through glass or optical fiber lines in the form of optical signals. Over the last two decades, optical fibers have revolutionized the communications industry. Meanwhile, continuous innovations in optical components have made it possible to design and implement higher and higher bit-rate systems. Consequently, fiber designs continue to evolve in almost every segment of the network infrastructure.

The major driver for all this activity is the urgent need for more capacity. The late 1990s have seen an enormous surge in the amount of traffic on telecom networks. Networks whose capacity looked demand-proof only two or three years ago are hard-pressed to cope with this demand. Not only is traffic growing, but also there is a fundamental change in the nature of this traffic. In the 80s and early 90s, the majority of network traffic consisted of voice. The growth in this traffic was, and still is, fairly predictable. However, the growth in data traffic is now far outstripping the growth in voice, spurred on by the Internet and corporate data applications. The advent of affordable higher bandwidth access mechanisms such as digital subscriber line technology will serve to accelerate this growth. Voice and data are already equal on some routes, and it is clear that in the next decade data will dominate telecom networks.

Wavelength division multiplexing (WDM) is a technique for transmitting traffic over fiber in multiple channels. Traditional optical fiber transmission uses light of a single wavelength (i.e. color). In contrast, WDM combines multiple wavelengths of light into a single, multiplexed signal for transmission along a fiber. Each channel utilizes the full capacity of the fiber being used. WDM thus creates 'virtual fiber': carrying traffic over, for example, four WDM wavelength channels boosts the capacity of an installed fiber by four times.

WDM is now being used by telecommunication companies worldwide to dramatically boost the capacity of installed optical fiber cables. However, the effect WDM will have on the telecommunication industry is much more complex, ranging far beyond simple capacity increase in networks, even though the basic principle of the technology is very simple. Accordingly, WDM is emerging as an essential technology for allowing telecommunication networks to endure the telecommunication demands of the next century. The future growth of the Internet, the creation of new high bandwidth applications, the economics of the bandwidth market itself and the development of broadband networking are all inextricably linked with WDM technology.

As optical technology advances and the optical layer materializes in telecommunications networks, new challenges have emerged for engineers and network planners. Just as synchronous optical networks (SONET) introduced new design issues, such as optimized traffic patterns and restoration schemes, implementation of the optical layer with wavelength add-drop multiplexers (WADMs) has new difficulties. Telecommunication companies, as well as many smaller companies and new entrants to the telecommunication business are planning to deploy WADMs in their network. Thus, it is important that these new difficulties are addressed.

Perhaps the most fundamental issue associated with WADMs in optical networks is end-to-end wavelength span design. As some wavelengths are dropped and added while others pass through a site, network designers must consider the span for each wavelength to insure the required performance. Planners must predict the performance of each channel individually, especially considering that the channels added will be of higher quality than those passing through.

One of the more complex span designs is that of mesh architectures. A mesh architecture is a design where each channel may take a dynamically routed path around failures. When utilizing mesh architectures, all possible scenarios need to be evaluated to insure that for a single or multiple fiber cuts or failures, traffic on a channel is not lost because of unacceptable optical performance.

When adding and dropping individual wavelengths in the network, it becomes imperative for providers to be able to manage the network with wavelength granularity. Providers must be able to monitor the condition of each wavelength and maintain network traffic in the same manner that electrical paths are managed today. The complexity of managing wavelengths also depends on whether the provider is using dedicated wavelength paths (WP) or "virtual" wavelength paths (VWP) in which the signal can change to another wavelength along the route. Ideally, the optical network will provide end to end services entirely in the optical domain, without ever converting signals into the electrical format.

The basic element in the optical network is the wavelength. As many wavelengths of signals are transported across the network, it becomes important to manage and switch each one individually. One of the benefits of optical networks is that it allows the network architecture for each wavelength to be different. For example, one wavelength may be established in the network to be part of a ring configuration, while another wavelength, using the same physical network, can be provisioned as point-to-point system. The flexibility of provisioning the network a wavelength at a time has led to two definitions of end-to-end services: wavelength paths and virtual wavelength paths.

The simplest implementation of a wavelength service in the optical network is a wavelength path (WP). Using a WP, a signal enters and exits the optical layer at the same wavelength, without ever changing to a different wavelength throughout the network. Essentially a wavelength is dedicated to connect the two endpoints together. This kind of design is typically much easier to plan for from an engineering perspective, because planners will know which wavelength will be used on all parts of the optical span. Designing is simply an issue of determining the path and calculating performance, as discussed above.

Although a WP is simple to implement, it can impose some limitations on the bandwidth available in the network and the cost of implementing it. One method to overcome this limitation is by using a "virtual" wavelength path (VWP) in which a signal path can travel on different wavelengths throughout the network. By avoiding a dedicated wavelength for an end-to-end connection, the network can reuse and optimize wavelengths to provide the greatest amount of capacity. The flexibility provided by VWPs comes at a cost: VWPs introduce more difficulty into the network design. For networks with a large number of all-optical paths, especially in metropolitan or access networks, VWPs can introduce a large number of possible optical path sets to be calculated and planned for.

Although the main driver for WDM today is the need to increase network capacity and relieve network congestion, WDM is part of a much bigger story of the evolution of electrical networks to optical networks. Eventually, WDM is expected to be used to route traffic on individual wavelengths in all levels of the network, significantly increasing flexibility. This transition will create an optical layer. The optical layer is a new networking layer in which wavelength channels are processed and routed only by optical equipment, just as electronic multiplexers, cross connects and switches handle semi-permanent digital channels in the synchronous digital hierarchy (SDH)/SONET and asynchronous transfer mode (ATM) layers of today's networks. As suggested above, this will involve the deployment of optical add-drop multiplexers, enabling WDM ring architectures to be constructed. In the longer term this will also require the deployment of optical cross connects to reconfigure and re-route individual wavelength channels in the network.

These recent advances in optical WDM technology are pushing this technology beyond simple point-to-point deployment and more towards applications in end-to-end networking. These trends will require more advanced network control features in order to take full advantage of the optical fiber bandwidth. Although much work has been done on static WDM network provisioning, the more important issue of network control in dynamic environments needs further investigation.

Thus, network configuration design and management in WDM networks is a crucial issue. The main concerns are designing an efficient virtual topology and effectively maintaining/adjusting it. Those skilled in the art will recognize that because physical topology design is very similar to the classical network design problem, it will not be discussed herein. Further, those skilled in the art will recognize that network configuration design and management in WDM networks is dependent on many external constraints, such as material and manpower costs, economic conditions, etc., and accordingly it will also not be discussed herein.

To date, researchers have focused on two main problems, namely virtual (logical) topology design and the related routing and wavelength assignment (RWA) problem. The former decides on the optical connectivity between different nodes, and the latter actually performs the wavelength assignment at the physical level.

Topology design for generic mesh-based networks is a complicated issue. Many authors have proposed various optimization-based approaches here, with the objectives being to maximize the offered network load and minimize performance related metrics, such as average delays, hop counts, etc. Others have also devised more heuristic-type schemes, which iteratively assign paths to heavier-traffic source-destination pairs and use network-pruning techniques to handle the remaining connection requests. One benefit of using such methods is that they can be augmented to incorporate non-linear cost metrics, such as packet delay, revenues, etc., which may be difficult to incorporate in linear optimization formulations. Other work in this area has also looked at using flow-deviation (load balancing) techniques and simulated annealing processes.

The RWA problem has also been well studied. Again, many authors have used optimization formulations to minimize various cost functions, i.e., minimize the number of wavelengths, blocking probabilities, delays, etc. For example, some work has cast the problem into integer linear (multi-commodity flow) or mixed integer type problems, and these are usually very compute-intensive.

Apart from optimization-type methods, more practical schemes for dynamic RWA problems have also been devised. In real networks, many connection setup requests arrive in random order and require fast processing. For such dynamic lightpath establishment (DLE), heuristics based on various cost metrics can be designed using shortest-path algorithms. To curtail increases in call blocking probabilities, connection re-routing heuristics can also be employed, i.e., partial/full wavelength reassignments. In addition, theoretical results in graph theory can also be used here, such as node interchange algorithms for graph coloring problem. Overall, results from such ad-hoc approaches have compared favorably with those from more complex optimization schemes.

Although many solutions have been devised for the topology design and wavelength routing problems, practical implementation concerns, however, have not been treated as thoroughly. Although this may appear as a control issue, largely orthogonal to the traffic management aspect, effective schemes are necessary here to realize the benefits of wavelength routing. As an example, any of the previously cited optimization type schemes for routing virtual path requests in a given network only lends themselves to a centralized control solution, in which a main network controller performs the channel route computation process and sends configuration updates to each optical node via logical control channels.

In such solutions, the controller entity, possibly co-located with an electronic network node, requires global (i.e., network-wide) knowledge and must be sufficiently powerful since optimization schemes are generally very compute intensive. For example, typical computation times are in the order of hundreds of seconds even for moderate network sizes and reasonable constraint sets. Such performance may be unacceptable in many practical network settings where improved response times are important. Moreover all major non-optical routing protocols for large-scale networks are based upon distributed paradigms, i.e., Internet Protocol's (IP's) Open Shortest Path First (OSPF) and Border Gateway Protocol (BGP), and ATM's Private Network-Node Interface (PNNI).

Generally, it is expected that maturing optical networks will require signaling protocols of their own to provision and protect lightpath channels for a variety of higher-level networking clients. Distributed routing schemes basically implement the decision/computation process over multiple network nodes, with each optical node running a distributed control protocol. Nodes distribute information amongst themselves, such as load changes, alarm events, feature sets, etc., and use this to help in the route computation process.

Such schemes are normally more robust, since route resolutions around failed network elements are still possible given adequate connectivity in the underlying physical graph. However, due to their decentralized nature, not all schemes, i.e., virtual topology or RWA algorithms, can be ported to practical network environments. Usually, only heuristics-based schemes, such as those using modified shortest-path algorithms, lend themselves to distributed implementations.

Not much work exists on the topic of distributed routing in WDM networks, although a sample scheme for performing wavelength routing has been specified by R. Ramaswami and A. Segall, in "Distributed Network Control for Wavelength-Routed Optical Networks," Proceedings of the IEEE INFOCOM 1996, San Francisco, Calif., April 1996. Nevertheless, this scheme is limited to ATM network interworking and requires each node to maintain a detailed, complete snapshot of the global network state, i.e., basically enough information to locally resolve complete end-to-end paths. However, for large channel counts and increased signaling frequencies, this scheme is not scalable due to the excessive per-channel overheads involved, i.e., accounting, signaling, etc.

Therefore, there is a clear need for more robust, distributed channel control protocols in optical networks. These must support multiple client protocols and incorporate more scalable routing metrics (and possibly physical layer limitations).

It can be seen then that there is a need for a distributed framework to provision channels (i.e., wavelengths) in WDM networks.

It can also be seen that there is a need for a flexible channel provisioning protocol framework for providing virtual links to multiple higher layer networking clients.

SUMMARY OF THE INVENTION

To overcome the limitations in the prior art described above, and to overcome other limitations that will become apparent upon reading and understanding the present specification, the present invention discloses a method and apparatus for providing channel provisioning in optical wavelength division multiplexing (WDM) networks.

The present invention solves the above-described problems by providing a distributed framework to provision channels (i.e., wavelengths) in WDM networks.

A method in accordance with the principles of the present invention includes managing configuration of underlying lower layer optical devices and processing inter-mode and client messages and alarm events.

Other embodiments of a method in accordance with the principles of the invention may include alternative or optional additional aspects. One such aspect of the present invention is that the processing of inter-node messages further includes setting-up bandwidth channels between peer nodes in wavelength division multiplexing networks using a channel request message, the channel request message specifying an associated channel feature set for a requested channel, releasing a preexisting channel using a channel release message and managing a resource update message for distributing network information used for route resolution.

Another aspect of the present invention is that the channel feature set specifies attributes for the channel.

Another aspect of the present invention is that the attributes for the channel include bandwidth, quality, resilience, policy and pricing.

Another aspect of the present invention is that the setting-up includes computing a shortest-path computation in response to the channel request message.

Another aspect of the present invention is that the setting-up bandwidth channels includes using an explicit channel specification.

Another aspect of the present invention is that the explicit channel specification is made according to pre-defined policy decisions.

Another aspect of the present invention is that the channel release message frees resources associated with the released channel.

Another aspect of the present invention is that the network information includes usage and cost information.

Another aspect of the present invention is that the managing a resource update message is initiated via a trigger.

Another aspect of the present invention is that the trigger is based upon a threshold scheme.

Another aspect of the present invention is that the network information includes metrics abstracting nodal resource levels.

Another aspect of the present invention is that the metrics include average channel utilization levels.

Another aspect of the present invention is that the metrics include fine-grained multi-channel bandwidth utilization parameters.

Another aspect of the present invention is that the setting-up, releasing and managing provide flexible channel provisioning for higher layer networking protocol clients.

Another aspect of the present invention is that the setting-up, releasing and managing configure lower layer optical devices.

Another aspect of the present invention is that the setting-up includes determining at a node receiving the channel request message whether resources are available for the channel request, determining whether the node receiving the channel request message is a destination node when the resources are determined to be available for the channel request and processing the channel request message based upon the determination of whether the node receiving the channel request is a destination node.

Another aspect of the present invention is that the channel request is accepted and a channel request accept message is propagated upstream when the receiving node is the destination node.

Another aspect of the present invention is that the next hop is resolved and the channel request is propagated downstream to the resolved next hop when the receiving node is not the destination node.

Another aspect of the present invention is that a channel request block message is propagated upstream when resources for the channel request are determined to not be available.

Another aspect of the present invention is that the releasing includes freeing resources associated with the channel release message, updating a resource status, determining whether the node receiving the channel release message is a destination node and processing the channel request message based upon the determination of whether the node receiving the channel release message is a destination node.

Another aspect of the present invention is that the channel release is confirmed and a channel release confirmation message is propagated upstream when the receiving node is the destination node.

Another aspect of the present invention is that the next hop is resolved and the channel release message is propagated downstream to the resolved next hop when the receiving node is not the destination node.

Another aspect of the present invention is that the managing includes determining whether the resource update per a resource update message reflects any change in resource allocations, updating network information pertaining to resource tables and topology overview and propagating the updated network information when there has been a change in resource allocations and propagating the resource update message when there has not been a change in resource allocations.

These and various other advantages and features of novelty, which characterize the invention, are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings that form a part hereof, and in which is shown by way of illustration the specific embodiment in which the invention may be practiced. It is to be understood that other embodiments may be utilized as structural changes may be made without departing from the scope of the present invention.

The present invention provides a distributed protocol/framework for wavelength channel control (i.e., wavelength routing) in optical wavelength division multiplexing (WDM) networks. The proposed channel provisioning (CP) protocol framework provides flexible channel (lightpath) provisioning for higher layer networking protocol clients such as IP, ATM, frame relay, and even SONET/SDH. The framework is designed to work with flexible optical cross-connects/wavelength router devices, although extensions to more limited devices (such as add-drop multiplexers) can be added. CP nodes communicate with their peers and client-networking protocols via appropriately defined messages.

Recent developments in wavelength-division multiplexing (WDM) technology have dramatically increased the traffic capacities of fiber optic networks, with the key enabling advancements coming in the area of optical components, i.e., amplifiers, laser sources, and filters. From these basic building blocks, more advanced sub-systems have been designed, such as add-drop-multiplexer (ADM) devices and optical/wavelength cross-connects (OXC/WXC) and wavelength routers/switches (WRS).

As improvements in optical components and sub-systems continue to emerge, the focus is now beginning to shift more towards network-level control for properly managing the windfall of bandwidth. Increasingly, network layer switching is becoming the bottleneck as opposed to bandwidth, and the trend is towards simpler, faster core networks. This is a significant departure from traditional telephone company reasoning, where complex nodes are used inside the network to provide bandwidth provisioning to end users.

To date, the deployment of WDM technology has mainly been in a point-to-point manner to increase bandwidth on existing fiber links. Nevertheless, although this does relieve the 'capacity exhaust' problem, the speed bottlenecks at the higher layer electronic nodes (IP routers or ATM switches) still remain. Hence it is likely that despite the large increase in bandwidth (up to even two orders of magnitude), existing solutions still cannot take full advantage of this capacity. To get around this electronic bottleneck, network designers are now beginning to use increasingly advanced WDM sub-systems, capable of selectively routing and switching individual wavelengths in the optical domain.

Figure 1:
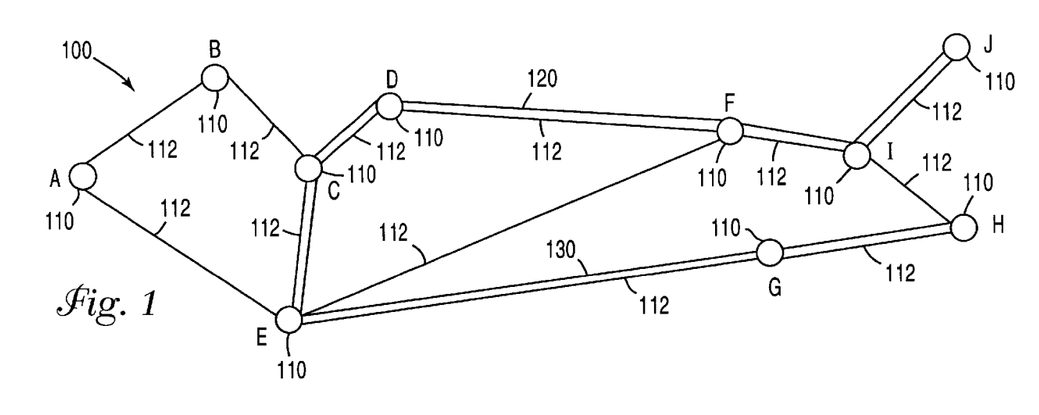
FIG. 1 illustrates a physical mesh topology for a fiber optic network.

FIG. 1 illustrates a physical mesh topology 100 for a fiber optic network. In FIG. 1, optical WDM nodes 110 are linked by physical links 112 in the mesh topology. The optical WDM nodes 110 may include configurable wavelength switches/routers and ADMs. FIG. 1 also shows a first virtual link 120 from node E to node J and a second virtual link 130 from node C to node H.

Figure 2:
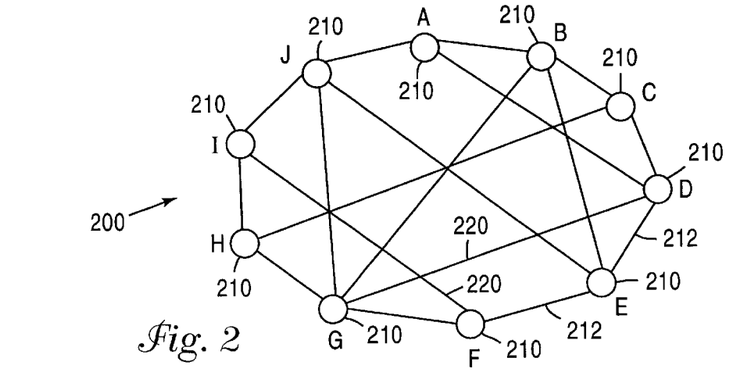
FIG. 2 illustrates a virtual network topology overlay for the physical mesh topology of FIG. 1.

FIG. 2 illustrates a virtual network topology overlay 200 for the physical mesh topology of FIG. 1. Electrical nodes 210, such as IP routers, ATM switches and SONET/SDH boxes, are linked by virtual links 212 to adjacent nodes in the virtual network topology. The nodes 210 may also include reconfigurable ADM, OXC, and WRS devices to establish channels 220 between non-adjacent nodes to build the virtual topology overlay, depending upon various physical limitations such as propagation losses, dispersion, crosstalk, etc.

Wavelength (lightpath) routing offers some key benefits for network operators. Since this allows increased connectivity between electronic-layer nodes (routers, switches), higher-layer routing is simplified, thereby reducing the net processing overhead per unit of transmitted data. In addition, by creating "virtual links", lightpath routing allows different network protocols to coexist on the same underlying physical network, i.e., protocol insensitivity. Path protection/restoration and overall network reliability issues can also be improved using the added wavelength dimensionality.

Figure 3:
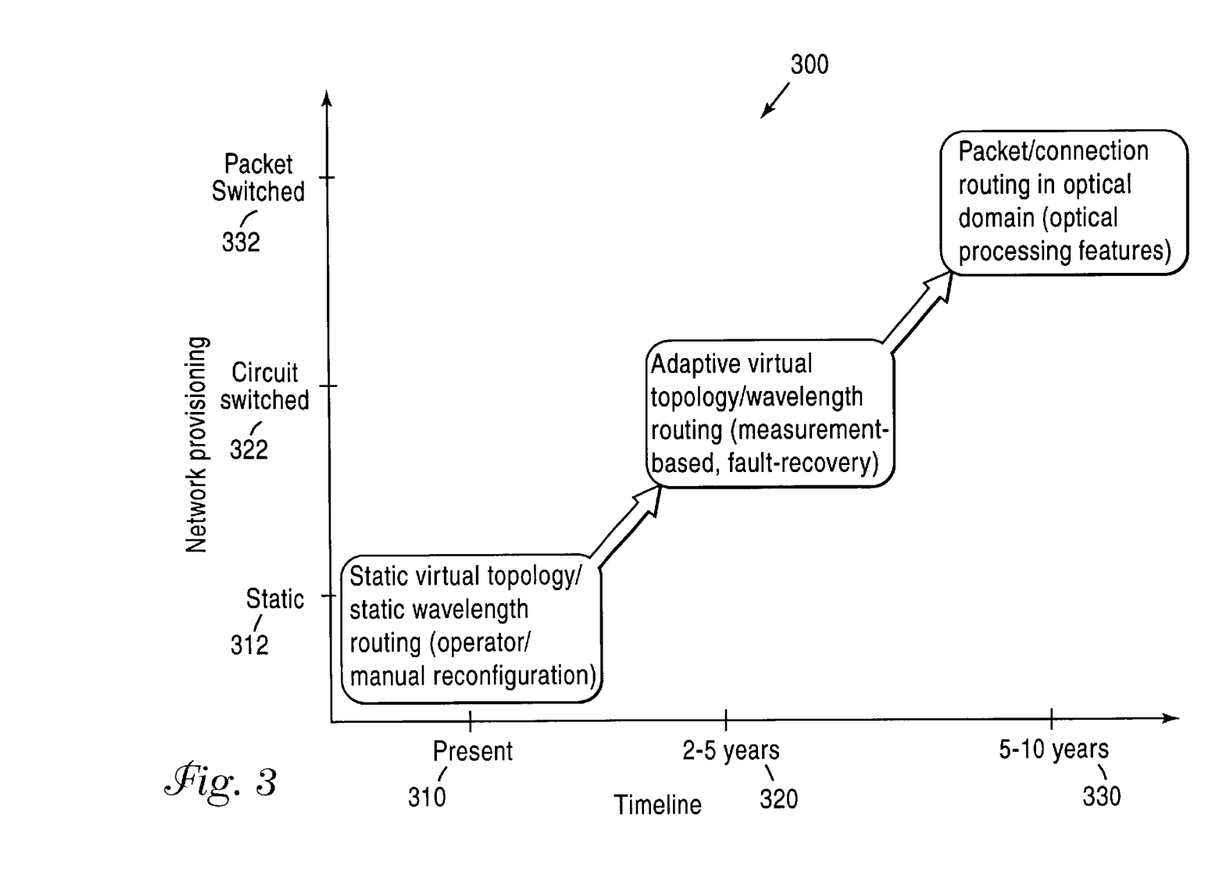
FIG. 3 illustrates a chart showing the evolution of optical networking based on maturity of the underlying technology.

One of the goals of the recently formed Optical Internetworking Forum (OIF) is to standardize such solutions, namely, performance and configuration management for network efficiency, fault recovery, etc. FIG. 3 illustrates a chart 300 showing the evolution of optical networking based on maturity of the underlying technology. Although longer-term research is also ongoing in optical buffering/processing technologies, it is expected that any related developments will still take a relatively long time to mature. FIG. 3 illustrates that at the present 310, network provisioning comprises a static virtual topology with static 312 wavelength routing, i.e., operator/manual reconfiguration. Moreover, the need for long-standing lightpath connections (i.e., "connection-oriented" provisioning) will most likely remain for various reasons, such as traffic aggregation and/or guaranteed delivery services, etc. Therefore in the interim, network designers will focus on improving optical network configuration/management methodologies. This is a viable approach and provides a good migration path towards to the future.

In 2–5 years 320, network provisioning will have evolved to circuit switched topology 322, to provide an adaptive virtual topology with wavelength routing that is measurement-based and provides for fault-recovery. In 5–10 years 330, the network provisioning will have evolved to a packet-switched topology 332 having packet/connection routing in the optical domain with optical processing features.

The present invention is a framework for topology control in mesh optical WDM networks, wherein a channel provisioning (CP) architecture is provided for performing distributed virtual topology control in optical WDM networks. According to the present invention, a distributed routing approach is used, which can incorporate a variety of graph-theoretic routing algorithms.

The overall goal of the channel provisioning (CP) protocol according to the present invention is to provide ubiquitous, inter-operable channel control architecture for WDM networks. The protocol functions with arbitrary configurations, such as rings, meshes, or hybrids, and is intended to be part of a larger operations, administration, management, and provisioning (OAM&P) framework for multi-vendor interoperable optical networks, i.e., optical user network interface concept, O-UNI.

Figure 4:
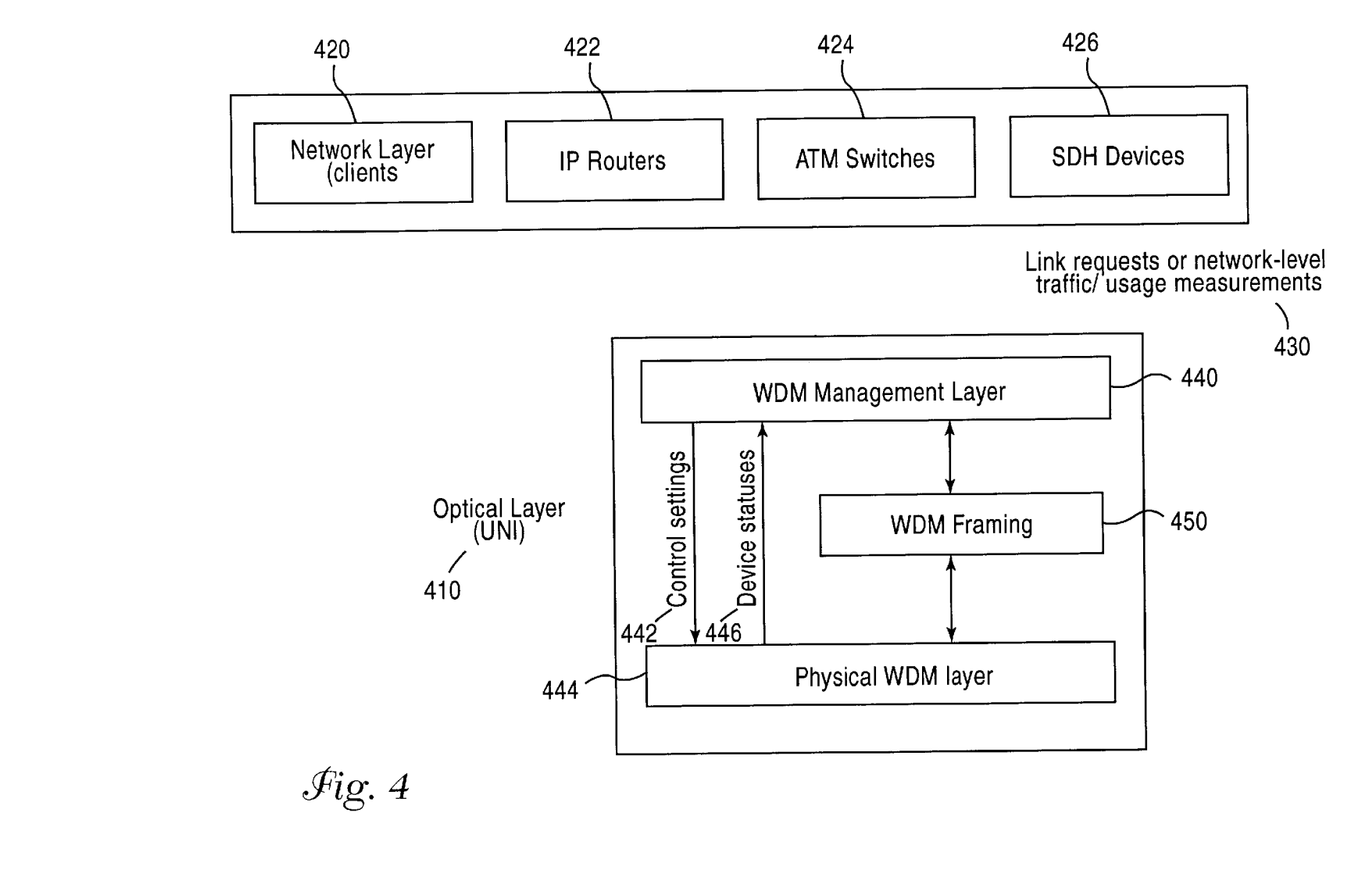
FIG. 4 illustrates a layer node showing the relationship between the optical layer user network interface and the clients in the network layer.

FIG. 4 illustrates a layer node 400 showing the relationship between the optical layer user network interface 410 and the clients in the network layer 420. In the CP framework according to the present invention, optical network nodes at the optical layer 410 communicate with their peers to provide services to higher layer electronic client nodes 420, such as IP routers 422, ATM switches 424, SONET/SDH cross-connects 426.

Link requests or network-level traffic/usage measurements 430 are provided to the optical layer user network interface 410. The optical layer user network interface 410 includes a WDM management layer 440 for receiving the link requests or network-level traffic/usage measurements 430. The WDM management layer 440 provides control settings 442 to the Physical WDM layer 444. The Physical WDM layer 444 provides device status 446 to the WDM management layer 440. A WDM framing layer 450 is provided between the WDM management layer 440 and the physical WDM layer 444.

Details on the node model and routing framework are now presented. As an aside, it should be mentioned that an addressing scheme is required for optical network nodes in particular. Herein, the assumption of using simple (flat) addressing will be made. However, those skilled in the art will recognize that extensions to a more hierarchical addressing setup will be necessary for scalability purposes, and that this will require WDM sub-domains to be defined and additional protocols for assigning domain controllers and inter-domain updates.

Figure 5:
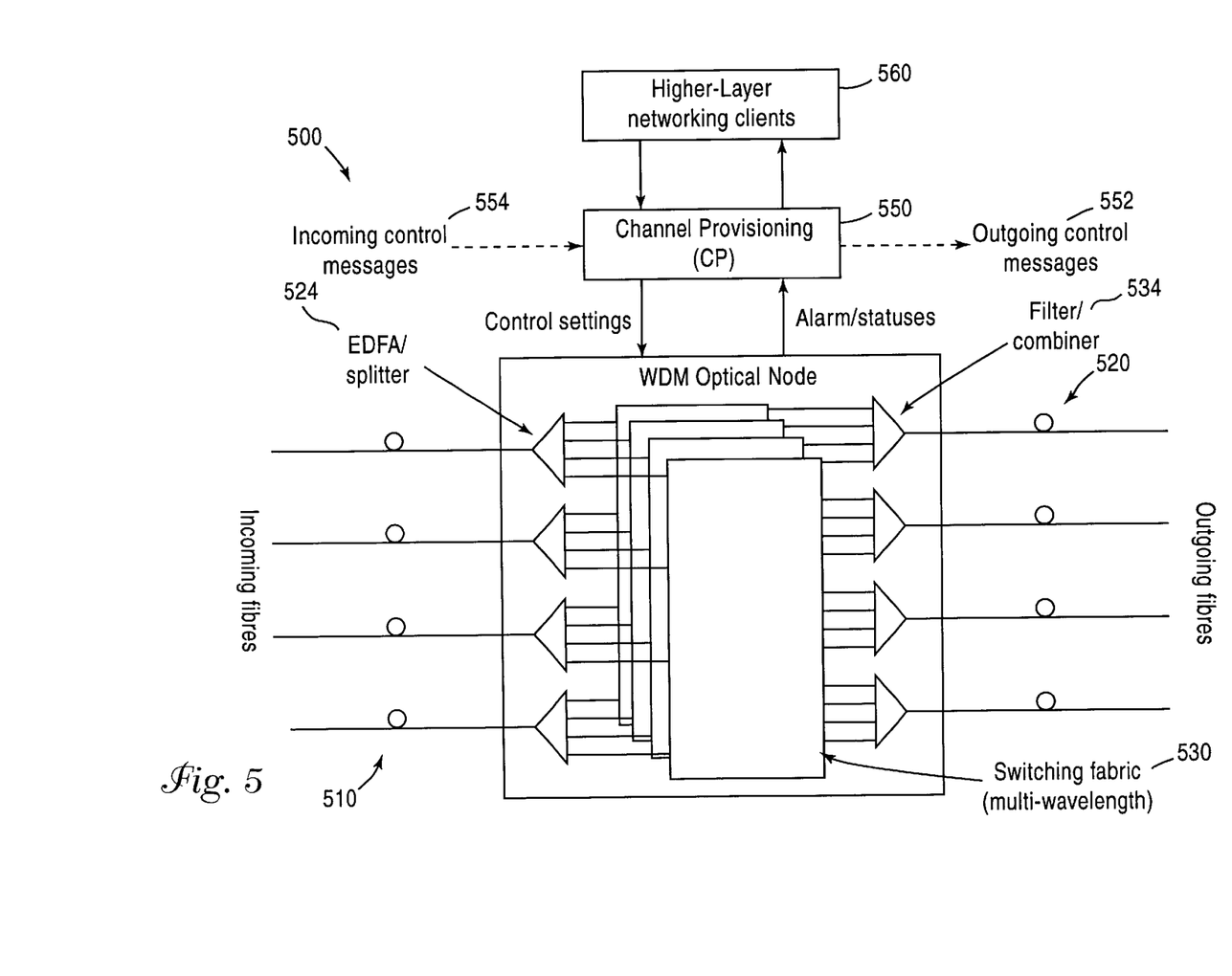
FIG. 5 illustrates a WDM network node according to the present invention.

FIG. 5 illustrates a WDM network node 500 according to the present invention. The node model assumed for WDM network node 500 is that of a reconfigurable OXC/WRS device, capable of full spatial switching. The WDM network node 500 of FIG. 5 can switch a given wavelength on any input link 510 to the same wavelength on any output link 520, if the wavelength is free on the outbound link. A fiber optic amplifier such as an Erbium Doped Fiber Optic Amplifier (EDFA) and splitter 524 receive input signals. The signals from the splitter are provided to a multi-wavelength switching fabric 530. Signals from the switching fabric 530 are filtered and combined at filter/combiner 534.

The WDM network node 500 according to the present invention places no assumptions on how the actual wavelength switching at the switching fabric 530 is performed, i.e., whether the actual wavelength switching is all optical (transparent) or opto-electronic (translucent) switching. Additionally, wavelength conversion capabilities can also be allowed since they can be incorporated into the routing framework at the switching fabric 530.

In an overly simplistic sense, if all WDM optical devices are considered as boxes with incoming and outgoing fiber links, the WDM network node 500 according to the present invention model is the most flexible solution. Nevertheless, such a model excludes other (simpler) network devices such as O-ADMs and hybrid switches with partial switching/routing and partial cut-through. Those skilled in the art will recognize that the CP protocol may have added constraints to the any-to-any switching capability of a reconfigurable OXC to model simpler WDM devices.

In addition, the WDM network node 500 according to the present invention allows a fully reconfigurable device to connect any incoming/outgoing channel to an optical-user network interface (O-UNI) port attached to (co-located with) an electrical node. It is assumed that any wavelength conversion facilities, using either tunable transmitters and/or receivers, can reside in either the optical network node or O-UNI, although the latter will simplify optical node designs.

To coordinate activities with other CP processes running on other WDM nodes, a CP module 550 also sends 552 and receives 554 control messages. However, the exact mechanism of achieving message transfers between WDM nodes is not defined here since it is largely orthogonal to the issues being discussed. Nevertheless, those skilled in the art will recognize that several possible approaches are possible, including the use of external data control networks, separate optical supervisory channels (OSC), sub-band communication techniques, and others.

The WDM network node 500 according to the present invention requires link-level framing protocols for packaging network-level data streams, i.e., WDM framing. Higher-layer networking clients 560 define protocols for routing data and communicate with the CP module 550. Those skilled in the art will recognize that this framing could range from stripped-down SONET/SDH framing to altogether new, improved protocols such as digital wrappers.

Figure 6:
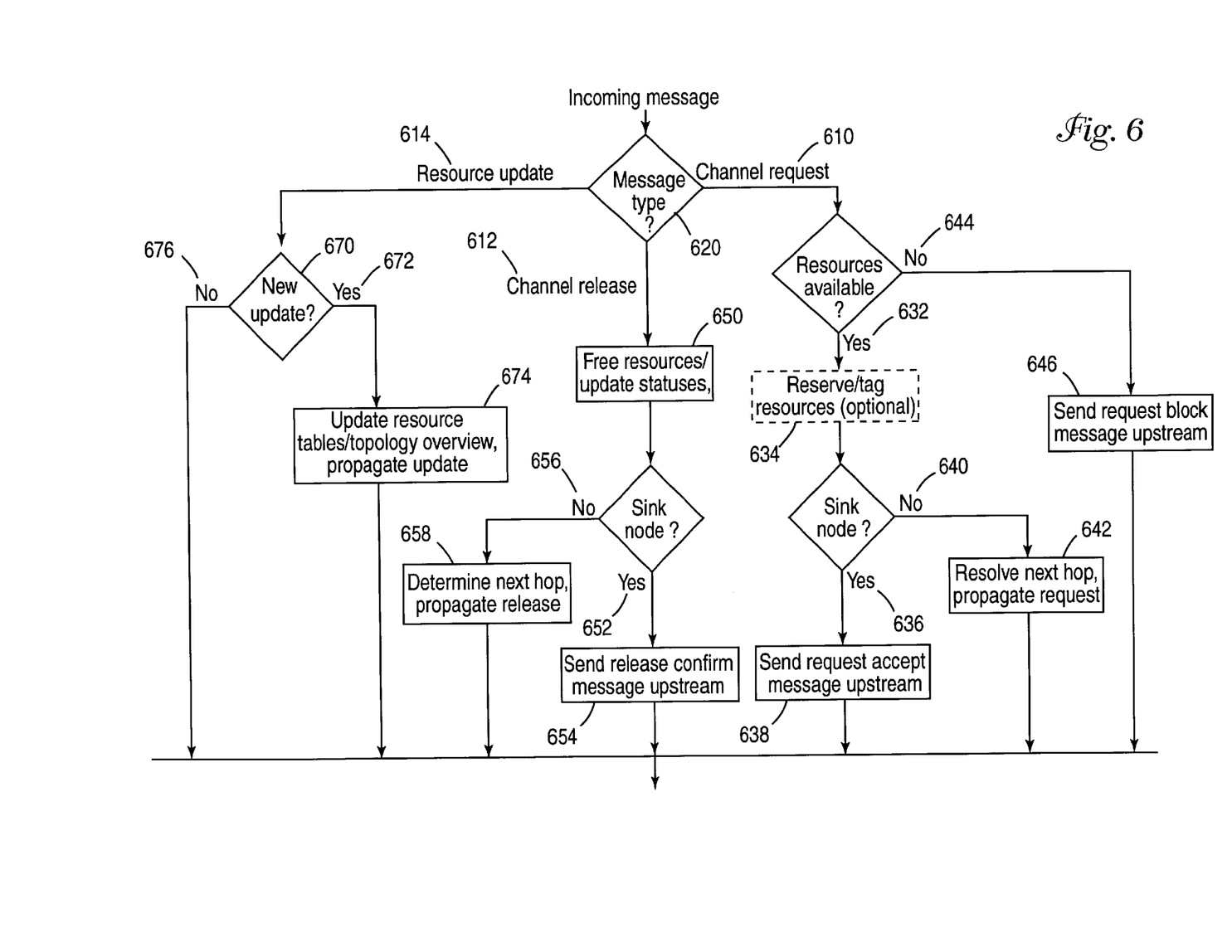
FIG. 6 illustrates a flow chart of the CP routing protocol according to the present invention.

FIG. 6 illustrates a flow chart of the CP routing protocol 600 according to the present invention. The CP routing protocol 600 comprises the core of the present invention and manages the overall configuration of the underlying optical devices (OXC or WRS). This process runs as a real-time software process at each WDM network node. Inter-node and client messages and alarm events are processed by the CP routing protocol.

The inter-node messaging consists of three main types of messages: channel request 610, channel release 612, and resource usage updates 614. The overall flow diagram for the functionality of the CP routing protocol 600, as shown in FIG. 6, includes processing the various inter-node message types 620. All message types and associated handling procedures are now described.

Channel Request Messages

Higher layer clients associated with electronic nodes use channel request messages to setup bandwidth channels between peer electronic nodes. The CP protocol handles these messages by communicating between the necessary optical nodes and appropriately configuring the lower layer optical subsystems. To generalize channel request provisioning, an optical (WDM) channel feature set is defined. This set comprises, but is not necessarily limited to, channel attributes such as bandwidth (i.e., granularity), quality, routing preferences, pricing, etc. These features must be specified in all channel requests and are subsequently incorporated in the CP routing protocol to determine channel routes.

For example, non-linear degradation arising from physical-layer effects such as crosstalk and dispersion can pose many problems for multi-hop wavelength routing. Hence, to maintain a certain bit-error rate (BER) on a channel, the number of hops between the source and sink nodes may have to be limited, as specified in the quality attribute.

In other applications (such as traffic engineering), network service providers may want to explicitly specify channel routes, requiring a routing attribute. Furthermore, defining a resilience attribute in the channel feature set and adding the necessary provisions to the routing protocol provide additional fault-recovery capabilities.

Channel route resolution is required for channel request messages. When an initial source node receives a channel request, it first checks if it can provide the required resources specified in the requested channel feature set 630.

For example, the source must determine the next hop link for the channel route and see if it has sufficient resources, (e.g., free channels of required granularities) to route to that outbound link. To allow for widescale generality, the next hop link can be determined in a variety of ways. One would be based upon using the (filtered) topology information extracted from the routing update messages, i.e., dynamic routing PI type solution, discussed subsequently. Alternatively, the next hop may be fixed by prior policy decisions, i.e., static routing, or specified explicitly by the routing attribute in the requested channel's feature set, i.e., explicit routing feature.

If the source can fulfill these "local" requirements, it propagates the channel request to the peer node at the other end of the next hop link 632. The actual switching resources, however, may or may not be committed at this time 634. If the next node is the destination (sink) node 636, the destination node signals a channel request accept message upstream to the originating source node. 638. If the next node is not the destination node 640, the next hop is resolved and the request is propagated upstream 642. Similarly, these downstream nodes check their resource levels and either accept or deny the channel request.

If the resources are not available 644, the upstream node (which propagated the request message) is signaled indicating a channel block status 646. Eventually, this channel block message arrives at the originating source node, and this entity can take a variety of actions. These include either re-trying the request after an appropriate time interval, i.e., backoff strategies, or selecting another outbound link and propagating a new request.

Channel Release

Channel release messages are relatively straightforward to process. The source node simply validates the request, i.e., from a legitimate client for a legitimate channel, and frees all local resources assigned for that channel 650. If the resultant change in resource levels is enough to warrant a resource update message to neighboring nodes, such a message can be generated and sent.

Subsequently, the release message is passed to downstream channel nodes. When the sink (destination) node receives the request 652, it signals a procedure completion to the originating (source) node 654. If the next node is not the sink node 656, the next hop is determined and the release is propagated downstream 658.

Resource Updates

For non-explicitly routed channels, the CP protocol uses an adaptive link-state routing approach. Each node maintains reachability information to all other network nodes. When a resource update message is received, a determination is made as to whether the resource update reflects any change 670. If there is a change 672, each node floods its resource (routing) table to all other nodes 674. If not 676, the resource update message is propagated downstream 678.

These routing update messages are generated by appropriate trigger mechanisms and are used to indicate the resource levels of network links/nodes via appropriate resource usage metrics. In general, the performance of the channel routing algorithm is very much dependent on the above two mechanisms. It is well known that excessive information in link metrics or update generation can result in continual transient behaviors and routing instability.

For example, consider the case of a WDM subnetwork with a moderate channel count (below ten wavelengths/link), containing a relatively small amount of nodes (under ten). If the channel request/release rate is sufficiently low (tens of seconds), then it is quite feasible for network nodes to disseminate per-channel information for each link upon some change of status. Such channel information should include the status of the wavelength (free/reserved), and possibly even a cost metric reflecting switching overhead and/or physical impairment accumulations. However, such an approach will likely be less scalable to larger, more dynamic systems.

First of all, if channel counts are on the order of hundreds of wavelengths/link and there are more nodes in the network (order of tens), then the size and number of routing updates will grow in quadratic manner (i.e., since information is being disseminated to all subnetwork nodes). Even more detrimental to such a per-channel update approach, however, is an increase in the channel request/release rate.

With these concerns in mind and in light of the rapid development of WDM technology, building scalable solutions must be a paramount concern. Future systems will likely contain much larger channel counts and improved switching capabilities and it is likely that request profiles will become more dynamic. In such environments, it is crucial to minimize the frequency of updates and also to develop effective link/node-level, which can effectively reduce/compress the level of propagated information as necessary metrics (i.e., state-aggregation).

Although, the CP protocol according to the present invention is applicable to different types of metrics and triggers, some example solutions for metrics and triggers are presented herein for illustration. However, those skilled in the art will recognize that the example solutions presented herein are by no means meant to be exhaustive for the overall framework.

Cost Metrics

From a network efficiency point of view, cost metrics should accurately reflect the loading on the links. As an example, a very simple usage metric mechanism would simply be channel utilization on the link. Each link update would contain one value, indicating how many of the channels are assigned on the link. However, what makes the routing problem difficult is that the utilization level is a scalar and cannot indicate exactly which channels are being used. As a result, source routing algorithms will have incomplete knowledge about the exact identity (or ranges) of free channels when originating requests for a given channel (s).

Figure 7:
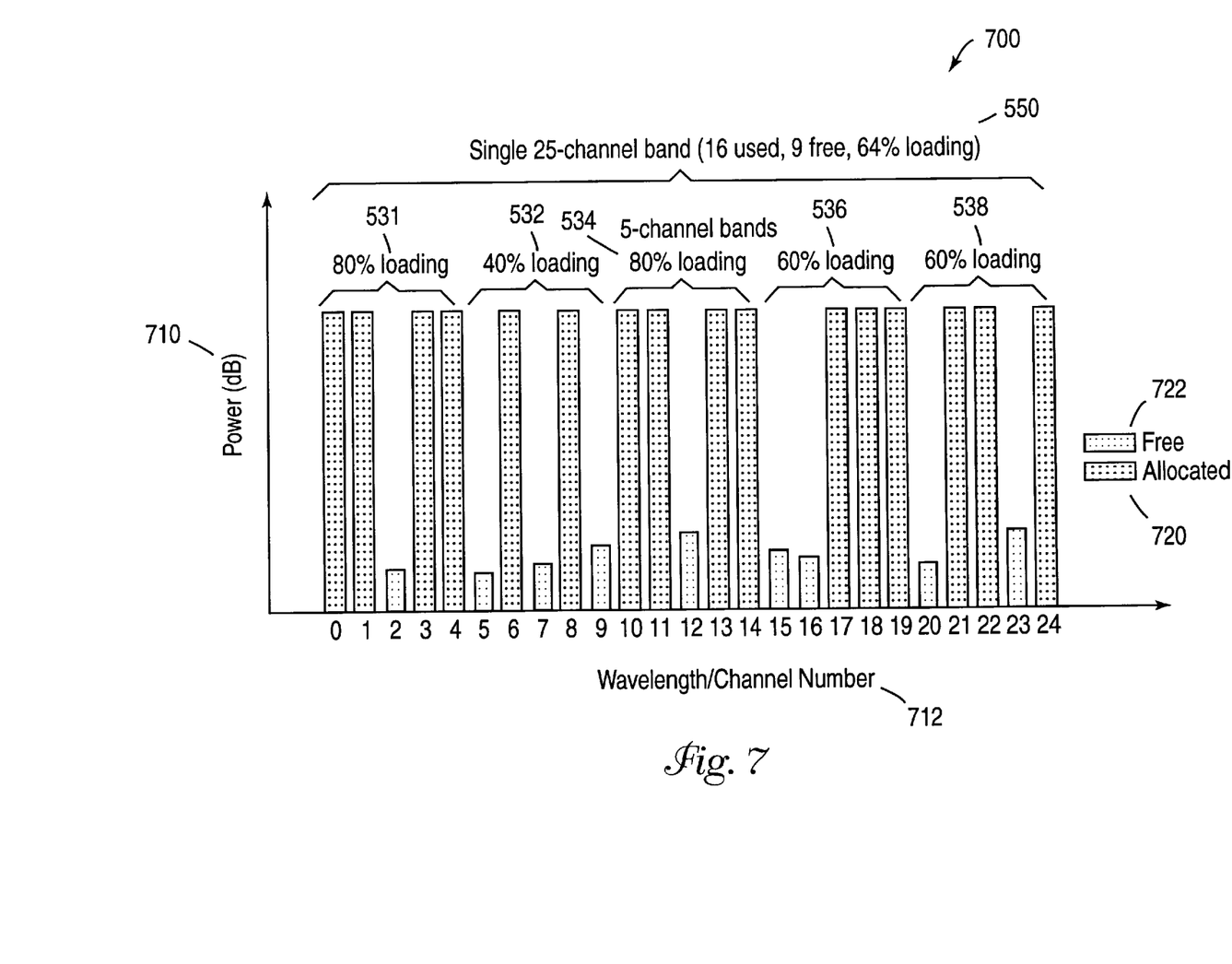
FIG. 7 shows a sample 5-band channel representation for a 25-channel WDM system.

To address this issue, without having to broadcast excessive per-channel information, various solutions can be used. One would be a channel grouping approach, where wavelength channels are grouped together to represent multi-channel bands. For example, FIG. 7 shows a sample 5-band channel representation for a 25-channel WDM system 700. Clearly, the (above-mentioned) aggregate utilization metric is a special case, where there is one band spanning all the channels. In FIG. 7, the power 710 for each of the 25 wavelength/channels 712 is shown. The 25 channels are grouped into five 5-channel bands. The usage for each of the bands is shown as allocated 720 or free 722. Thus, the first 5-channel band 531 comprises 80% loading. The second 5-channel band 532 comprises 40% loading. The third 5-channel band 534 comprising 80% loading. The fourth 5-channel band 536 comprises 60% loading. Finally, the fifth 5-channel band 538 comprises 60% loading. Accordingly, the 25-channel band includes 16 used channels and 9 free channels for a 64% loading 550.

Other enhancements to this approach are possible, such as averaging the utilization levels indicated for each band (in the case of highly dynamic settings). Note that the above discussion has only focused on usage metrics. Additionally, broader metrics can also be defined to account for pricing or other policy structures. Network nodes can use such metrics when resolving route requests with given pricing/policy attributes in the channel feature set. These are not considered further since they are more related to infrastructure and revenue-generation concerns.

One of the goals of the channel routing protocol is to properly utilize the WDM network's core resources, namely its wavelength channels and switching/routing capacities. Hence the CP protocol must try to minimize blocking probabilities for generic, i.e., non-explicitly-routed, setup requests and also achieve some level of load balancing across the WDM network. To achieve these objectives, network nodes exchange resource usage information and use graph-theoretic path computation techniques. Specifically, the channel routing process derives network-level loading information from the resource update messages to help route channel requests. Normally, within the context of many network routing protocols, this information reflects changes in link statuses/costs, i.e., caused by failures/recoveries and manual reconfigurations. Likewise, to improve the effectiveness of channel routing, routing update messages must contain appropriate link (possibly node) resource characterizations. The efficiency of any shortest-path lightpath routing engine will depend in large part upon the choice of such metrics and also the trigger rules used for generating them.

Those skilled in the art will recognize that physical layer effects are much more pronounced in optical network devices, as opposed to electronic network devices. These include limitations such as power loss, crosstalk, dispersion, noise-amplification, and other non-linearities, etc. This issue is challenging in optical networks because these effects can depend very much upon the particular configuration the network node may be running and hence are not "static." Therefore, to address this concern, the option is also available for allowing route request messages to propagate physical-layer information pertaining to such effects. By defining additional cost metrics here, noise degradation can be dynamically computed between hops and this information can be used in conjunction with the previously defined route resolution strategies, i.e., shortest-path or explicit route mechanisms.

Essentially, each node receiving a route request can approximate the degradation the signal would experience if it were routed through its switching core on a particular (set of) channel (channels) and also that on the outgoing link. The downstream receiving node would use this information and add its own noise accumulation effects to determine if it can switch the channel without violating a certain, minimal (possibly user-specified) channel quality requirement (possibly incorporated into the quality attribute of the channel feature set, e.g., BER, SNR, etc.). Such a broad channel routing framework, incorporating both network resource-level and physical channel level details, will provide a more effective means for properly utilizing the overall network resources and ensuring high quality channels.

Those skilled in the art will recognize that the overall presentation of the route-provisioning step is rather broad since the present invention covers a wide range of potential renditions. Those skilled in the art will also recognize that the present invention does not preclude the inclusion of such features that may improve overall network performance. Some essential examples would include loop prevention techniques such as sequence number mechanisms, reservation collision reduction schemes, and clampdown timers to prevent excessive messaging. More advanced additions could include route crankback to reduce channel blocking probabilities.

Update Triggers

The purpose of the trigger mechanism is to continually refresh network nodes with the "latest" resource usage information. The CP proposal uses a basic threshold-based mechanism, wherein updates are generated whenever the chosen resource metric's value changes by a given threshold. For example, using the multi-channel band metric 700 above with reference to FIG. 7, usage updates could be generated whenever the utilization in any band 530–538 changes by 10%.

The trigger mechanism can use either fixed increments or dynamic increment intervals, and these should be chosen to prevent network instability during dynamic request/release arrival patterns. Additional variations of the threshold scheme using hysterisis-type settings can also be used. Such mechanisms have been used in many buffer-management schemes to reduce oscillatory behaviors.

Generating Channel Requests

Some related, broader concerns are now discussed here. First, the actual mechanism for generating channel requests has not been specified here, since these requests can be derived in various ways. One mechanism for generating channel requests is by network link/node failures, which require re-routing procedures. This particular case deals with the broader topic of fault restoration/recovery, which mandates more careful considerations.

Additionally, other avenues exist for lightpath request (and release) generation, premised upon some form of traffic management procedures at the higher layer protocols (such as MPLS). Specifically, schemes can be designed where such client protocols request/release lightpath channels based upon congestion levels (i.e., load balancing applications). These features can provide improvement in network-wide resource utilization.

Address Resolution

Since optical network nodes do not qualify as capable electronic devices, an independent form of addressing is required. This brings up the issue of address resolution across optical subnetworks for end-point identification. Carefully note that throughout the presentation of the CP protocol according to the present invention, it has been assumed that the ingress and egress optical network nodes are known for all channel setup requests. This requires that optical channel endpoints are capable of resolving higher-layer (IP, ATM) address endpoints amongst themselves (see FIG. 5).

Those skilled in the art will recognize that a variety of solutions are possible and that the one discussed herein are not meant to be exhaustive. For example, one would be to disseminate higher-layer electronic node address information (addresses, address ranges) as extensions to the messaging between CP nodes. Essentially, WDM nodes would indicate their client nodes (IP routers, ATM switches) to all other optical subnetwork nodes. However, some may argue against the scalability of this approach, especially with a large number of client devices. Hence more elaborate approaches can also be considered, e.g., for the case of IP traffic along the lines of the Internet Engineering Task Force's (IETF's) next-hop resolution protocol (NHRP) or the ATM Forum's multi-protocol over ATM (MPOA) protocol. The issue of channel identification is also important, especially if fault-recovery/restoration capabilities are required inside the WDM network. However, it is felt that this issue falls under link-layer framing/addressing requirements, and is not considered further.

Fault Restoration

The issue of fault restoration (i.e., network reliability) is also of paramount concern to many service providers who will eventually deploy WDM networks. Currently, existing SONET/SDH technology can provide very reliable service provisioning, with restoration times on the order of a few milliseconds. Any network restoration service offerings in emerging optical WDM networks must use these values as comparative requirements.

Nevertheless, many of the SONET/SDH-based schemes pose restrictions on the physical topologies that can be deployed and also require significant spare/backup network sources. It is felt that WDM technology provides a good opportunity to improve the overall fault restoration schemes in optical networks. Specifically, logical extensions to the CP framework can be made to allow for multiple types of restoration schemes at the optical layer. Additionally, interworking with higher-layer fault recovery mechanisms can also be devised to provide improved resource utilization and prevent network "flapping" behaviors during fault events. Such extensions for network reliability provisions in the over CP framework are provided to the higher-layer networking clients as illustrated in FIG. 5.

Figure 8:
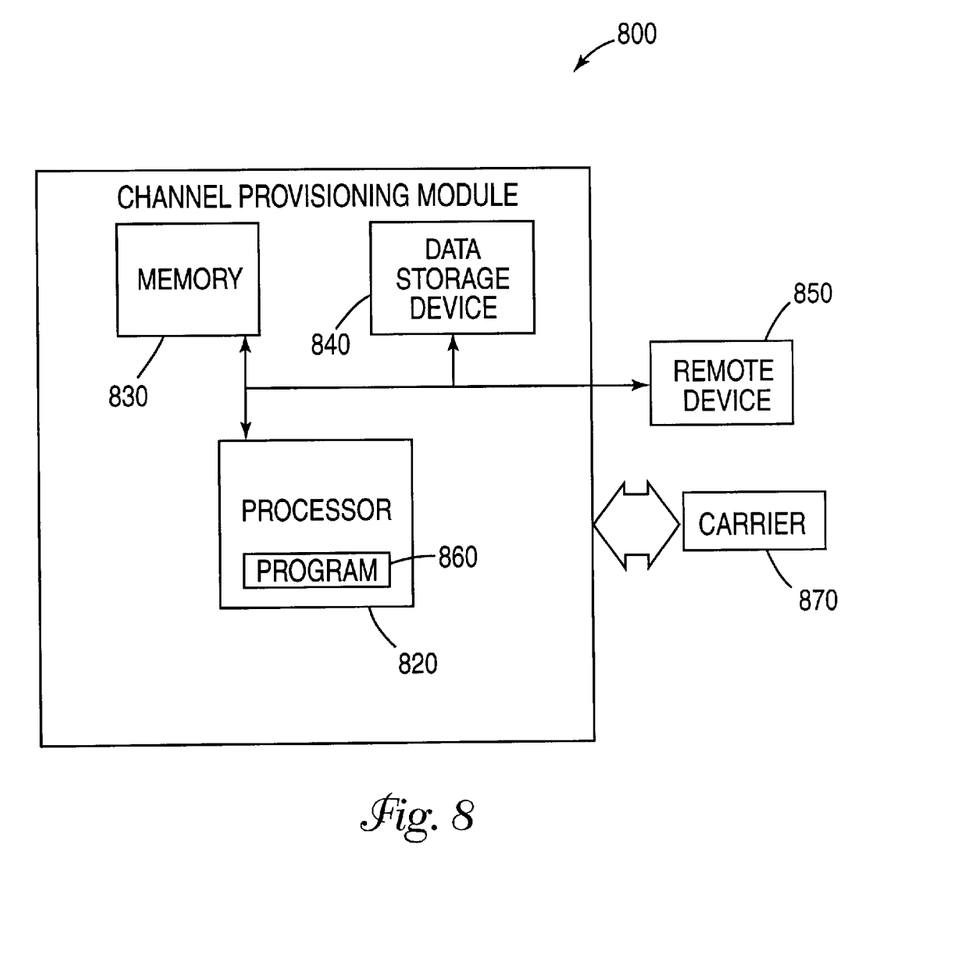
FIG. 8 illustrates a block diagram of a channel provisioning module according to the present invention.

FIG. 8 illustrates a block diagram of a channel provisioning module 800 according to the present invention. The channel provisioning module 800 generally includes, inter alia, a processor 820, memory 830 (such as RAM) and data storage devices 840. Those skilled in the art will recognize that any combination of the above components, or any number of different components, peripherals, and other devices, may be used.

The present invention is generally implemented using inter-related computer programs 860 that may be executed by the processor 820. All of the computer programs 860 include instructions which, when read and executed by the processor 820, causes the processor 820 to perform the steps necessary to implement and/or use the present invention. Generally, the computer programs 860 are tangibly embodied in and/or are readable from a device, carrier, or media 870 by the memory 830, data storage devices 840, and/or remote devices 850. The memory 830, data storage devices 840, and/or remote devices 850 are coupled to the processor 820.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass computer programs accessible from any computer-readable device, carrier, or media. Of course, those skilled in the art will recognize many modifications may be made to this configuration without departing from the scope of the present invention.

In summary, advances in optical component technology have heralded a new era in communications. The advent of WDM technology has dramatically increased network capacity, and current trends present a good economic case for deploying such technology. In light of these developments, there is an increasingly important need for designing reliable, effective topology control schemes for WDM optical networks. The present invention presents a generalized framework for provisioning lightpaths in WDM networks. The present invention is intended to provide a ubiquitous interface for a variety of higher-layer protocols. The scheme proposes the use of distributed routing protocol for lightpath setup and a novel link attribute mechanism for providing a range of service offerings to higher layer clients.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An optical channel provisioning method for wavelength division multiplexing networks, comprising:
    managing configuration of underlying lower layer optical devices; and
    processing inter-node and client messages and alarm events.

2. The method of claim 1 wherein the processing of inter-node messages further comprise:
    setting-up bandwidth channels between peer nodes in wavelength division multiplexing networks using a channel request message, the channel request message specifying an associated channel feature set for a requested channel;
    releasing a preexisting channel using a channel release message; and managing a resource update message for distributing network information used for route resolution.

3. The method of claim 2 wherein the channel feature set specifies attributes for the channel.

4. The method of claim 3 wherein the attributes for the channel comprise bandwidth, quality, resilience, policy and pricing.

5. The method of claim 2 wherein the setting-up comprises computing a shortest-path computation in response to the channel request message.

6. The method of claim 2 wherein the setting-up comprises using an explicit channel specification in response to the channel request message.

7. The method of claim 6 wherein the explicit channel specification is made according to pre-defined policy decisions.

8. The method of claim 2 wherein the channel release message frees resources associated with the released channel.

9. The method of claim 2 wherein the network information comprises usage and cost information.

10. The method of claim 2 wherein the managing a resource update message is initiated via a trigger.

11. The method of claim 10 wherein the trigger is based upon a threshold scheme.

12. The method of claim 2 wherein the network information comprises metrics abstracting nodal resource levels.

13. The method of claim 12 wherein the metrics comprise average channel utilization levels.

14. The method of claim 12 wherein the metrics comprise fine-grained multi-channel bandwidth utilization parameters.

15. The method of claim 2 wherein the setting-up, releasing and managing provide flexible channel provisioning for higher layer networking protocol clients.

16. The method of claim 2 wherein the setting-up, releasing and managing configure lower layer optical devices.

17. The method of claim 2 wherein the setting-up comprises:
   determining at a node receiving the channel request message whether resources are available for the channel request;
   determining whether the node receiving the channel request message is a destination node when the resources are determined to be available for the channel request; and
   processing the channel request message based upon the determination of whether the node receiving the channel request is a destination node.

18. The method of claim 17 wherein the channel request is accepted and a channel request accept message is propagated upstream when the receiving node is the destination node.

19. The method of claim 17 wherein the next hop is resolved and the channel request is propagated downstream to the resolved next hop when the receiving node is not the destination node.

20. The method of claim 17 wherein a channel request block message is propagated upstream when resources for the channel request is determined to not be available.

21. The method of claim 2 wherein the releasing comprises:
   freeing resources associated with the channel release message;
   updating a resource status;
   determining whether the node receiving the channel release message is a destination node; and
   processing the channel request message based upon the determination of whether the node receiving the channel release message is a destination node.

22. The method of claim 21 wherein the channel release is confirmed and a channel release confirmation message is propagated upstream when the receiving node is the destination node.

23. The method of claim 21 wherein the next hop is resolved and the channel release message is propagated downstream to the resolved next hop when the receiving node is not the destination node.

24. The method of claim 2 wherein the managing comprises:
   determining whether the resource update per a resource update message reflects any change in resource allocations;
   updating network information pertaining to resource tables and topology overview and propagating the updated network information when there has been a change in resource allocations; and
   propagating the resource update message when there has not been a change in resource allocations.

25. A channel provisioning module, comprising:
   a processor for processing data and programs;
   a memory, coupled to the processor for providing a working space for the processor; and
   data storage, coupled to the processor for storing data and programs used by the processor;
   wherein the processor manages configuration of underlying lower layer optical devices for a wavelength division multiplexing network and processes inter-node and client messages and alarm events.

26. The channel provisioning module of claim 25 wherein the processor processes the inter-node messages by setting-up bandwidth channels between peer nodes in wavelength division multiplexing networks using a channel request message, the channel request message specifying an associated channel feature set for a requested channel, releasing a preexisting channel using a channel release message and managing a resource update message for distributing network information used for route resolution.

27. The channel provisioning module of claim 26 wherein the channel feature set specifies attributes for the channel.

28. The channel provisioning module of claim 27 wherein the attributes for the channel comprise bandwidth, quality, resilience, policy and pricing.

29. The channel provisioning module of claim 26 wherein the processor sets-up bandwidth channels using the channel request message via a shortest-path computation process.

30. The channel provisioning module of claim 26 wherein the processor sets-up bandwidth channels using the channel request message via an explicit channel specification.

31. The channel provisioning module of claim 30 wherein the explicit channel specification is made according to pre-defined policy decisions.

32. The channel provisioning module of claim 26 wherein the channel release message frees resources associated with the released channel.

33. The channel provisioning module of claim 26 wherein the network information comprises usage and cost information.

34. The channel provisioning module of claim 26 wherein the processor is triggered to initiate management of the resource update message.

35. The channel provisioning module of claim 34 wherein a trigger for triggering the processor is based upon a threshold scheme.

36. The channel provisioning module of claim 26 wherein the network information comprises metrics abstracting nodal resource levels.

37. The channel provisioning module of claim 36 wherein the metrics comprise average channel utilization levels.

38. The channel provisioning module of claim 36 wherein the metrics comprise fine-grained multi-channel bandwidth utilization parameters.

39. The channel provisioning module of claim 26 wherein the processor sets-up bandwidth channels, releases preexisting channels and manages resource updates to provide flexible channel provisioning for higher layer networking protocol clients.

40. The channel provisioning module of claim 26 wherein the processor sets-up bandwidth channels, releases preexisting channels and manages resources updates to configure lower layer optical devices.

41. The channel provisioning module node of claim 26 wherein the processor sets-up bandwidth channels by determining at a node receiving the channel request message whether resources are available for the channel request, determining whether the node receiving the channel request message is a destination node when the resources are determined to be available for the channel request and processing the channel request message based upon the determination of whether the node receiving the channel request is a destination node.

42. The channel provisioning module of claim 41 wherein the processor accepts the channel request and propagates a channel request accept message upstream when the receiving node is the destination node.

43. The channel provisioning module of claim 41 wherein the processor resolves the next hop and propagates the channel request downstream to the resolved next hop when the receiving node is not the destination node.

44. The channel provisioning module of claim 41 wherein the processor propagates a channel request block message upstream when resources for the channel request is determined to not be available.

45. The channel provisioning module of claim 26 wherein the processor releases preexisting channels by freeing resources associated with the channel release message, updating a resource status, determining whether the node receiving the channel release message is a destination node and processing the channel request message based upon the determination of whether the node receiving the channel release message is a destination node.

46. The channel provisioning module of claim 45 wherein the processor confirms the channel release and propagates a channel release confirmation message upstream when the receiving node is the destination node.

47. The channel provisioning module of claim 45 wherein the processor resolves the next hop and propagates the channel release message downstream to the resolved next hop when the receiving node is not the destination node.

48. The channel provisioning module of claim 26 wherein the processor manages resource updates by determining whether the resource update per a resource update message reflects any change in resource allocations, updating network information pertaining to resource tables and topology overview and propagating the updated network information when there has been a change in resource allocations and propagating the resource update message when there has not been a change in resource allocations.

49. An article of manufacture comprising one or more computer program products tangibly embodying one or more computer programs that when read by one or more computers causes the computers to perform a method for provisioning channels in a wavelength division multiplexing network, the method comprising:

managing configuration of underlying lower layer optical devices; and processing inter-node and client messages and alarm events.

50. The article of manufacture of claim 49 wherein the processing of inter-node messages further comprise:

setting-up bandwidth channels between peer nodes in wavelength division multiplexing networks using a channel request message, the channel request message specifying an associated channel feature set for a requested channel;

releasing a preexisting channel using a channel release message; and managing a resource update message for distributing network information used for route resolution.

51. A node in a wavelength division multiplexing network, comprising:

a wavelength division multiplexing node for receiving optical signals and routing the optical signals to an appropriate output port;

a networking client layer for defining protocols for routing data; and a channel provisioning module, coupled to the wavelength division multiplexing node and the networking client layer, the channel provisioning module including a processor for managing configuration of underlying lower layer optical devices and processing inter-node and client messages and alarm events.

52. The node of claim 51 wherein the processor processes the inter-node messages by setting-up bandwidth channels between peer nodes in wavelength division multiplexing networks using a channel request message, the channel request message specifying an associated channel feature set for a requested channel, releasing a preexisting channel using a channel release message and managing a resource update message for distributing network information used for route resolution.

* * * * *